United States Patent
Beier et al.

(10) Patent No.: US 7,358,464 B2
(45) Date of Patent: Apr. 15, 2008

(54) METHOD FOR TEMPERATURE MEASUREMENT IN A HOUSEHOLD APPLIANCE

(75) Inventors: Dominic Beier, Guetersloh (DE); Wenzel Meierfrankenfeld, Guetersoh (DE)

(73) Assignee: Miele & Cie. KG, Guetersloh (DE)

( * ) Notice: Subject to any disclaimer, the term of this patent is extended or adjusted under 35 U.S.C. 154(b) by 184 days.

(21) Appl. No.: 11/393,768

(22) Filed: Mar. 30, 2006

(65) Prior Publication Data

US 2006/0219705 A1  Oct. 5, 2006

(30) Foreign Application Priority Data

Mar. 31, 2005  (DE) .................... 10 2005 015 028

(51) Int. Cl.
H05B 6/50 (2006.01)
H05B 1/02 (2006.01)
F24C 7/08 (2006.01)
G01K 7/00 (2006.01)

(52) U.S. Cl. .................... 219/497; 219/392; 219/494; 219/495; 219/704; 219/712; 219/713

(58) Field of Classification Search ............... 219/392, 219/494, 495, 497, 704, 712, 713
See application file for complete search history.

(56) References Cited

U.S. PATENT DOCUMENTS 4,297,557 A  10/1981  Tyler et al. .............. 219/10.55
4,340,796 A  7/1982  Yamaguchi et al. ..... 219/10.55
6,075,463 A  6/2000  Wauer ........................ 340/870

FOREIGN PATENT DOCUMENTS

| DE | 27 19 588 | 11/1977 |
|---|---|---|
| DE | 29 35 282 | 3/1980 |
| DE | 44 13 211 | 10/1995 |
| DE | 44 21 373 | 12/1995 |
| DE | 197 23 127 | 12/1998 |
| DE | 198 28 170 | 12/1999 |
| EP | 0 883 327 | 12/1998 |
| JP | 57082628 A * | 5/1982 |

* cited by examiner

Primary Examiner—Tu Ba Hoang
Assistant Examiner—Stephen J. Ralis
(74) Attorney, Agent, or Firm—Darby & Darby

(57) ABSTRACT

A method for temperature measurement in a household appliance includes generating a high-frequency electromagnetic excitation wave of a predefined transmit frequency. The transmit frequency is selected from a frequency band including temperature-dependent resonant frequencies that occur in a surface wave device incorporated in a temperature measuring probe and which respectively correspond to temperatures expected at the temperature measuring probe during operation of the household appliance. During a first phase, the excitation wave is wirelessly transmitting to the surface wave device. During a second phase following the first phase, an electromagnetic response wave generated by the excitation wave in the surface wave device is wirelessly transmitting to a processing unit. Signal levels of response signals generated from response waves of different transmit frequencies are measured and compared to determine the current temperature of the surface wave device based on the transmit frequency associated with the highest signal level.

15 Claims, 3 Drawing Sheets

METHOD FOR TEMPERATURE MEASUREMENT IN A HOUSEHOLD APPLIANCE

Priority is claimed to German patent application DE 10 2005 015 028.4, filed Mar. 31, 2005, the entire subject matter of which is hereby incorporated by reference herein.

The present invention relates to a method for temperature measurement in a household appliance.

BACKGROUND

A method for temperature measurement in a household appliance is described, for example, in German Patent DE 29 35 282 C2. In the known method, a processing unit of the household appliance generates a high-frequency electromagnetic excitation wave. The pre-defined transmit frequency is selected from a frequency band containing the temperature-dependent resonant frequencies that occur in an LC resonant circuit incorporated in a temperature measuring probe and which correspond to the temperatures expected at the temperature measuring probe during operation of the household appliance. During a first phase, the excitation wave is wirelessly transmitted to the LC resonant circuit of the temperature measuring probe. As a result, an electromagnetic response wave is generated in the LC resonant circuit, said electromagnetic response wave being wirelessly transmitted back to the processing unit during a second phase immediately following the first phase. The aforementioned process sequence is repeated continuously while increasing the transmit frequency in fixed frequency steps until the frequency band has been covered. The response waves received by the processing unit are converted to response signals. In an evaluation circuit of the processing unit, a pulse counter determines the temperature-dependent resonant frequency, and thus, the temperature at the temperature measuring probe. The known system has the disadvantage that LC resonant circuits are generally not suitable for use at high temperatures, such as around 250° C.

From DE 197 23 127 A1, it is known that surface wave devices can be used for temperature measurement in cooking zones of a cook top. There, the evaluation process provides for the temperature at the temperature measuring probe to be inferred based on the phase shift between the pulse patterns of the reponse signals. The same holds for the subject matter of German Patent Application DE 198 28 170 A1. Alternatively, German Patent Application DE 44 13 211 A1 proposes to evaluate the response signals by Fourier transformation.

SUMMARY OF THE INVENTION

It is, therefore, an object of the present invention to provide a method for temperature measurement in a household appliance, which is less complex in terms of circuitry and less prone to failure and which is also suitable for use at elevated temperatures.

The present invention provides a method for temperature measurement in a household appliance. The method includes the following method steps:

generating a high-frequency electromagnetic excitation wave of a predefined transmit frequency selected from a frequency band containing the temperature-dependent resonant frequencies that occur in a surface wave device incorporated in a temperature measuring probe and which correspond to the temperatures expected at the temperature measuring probe during operation of the household appliance, the excitation wave being generated by an electrical processing unit of the household appliance;

during a first phase, wirelessly transmitting the excitation wave to the surface wave device of the temperature measuring probe;

during a second phase immediately following the first phase, wirelessly transmitting an electromagnetic response wave generated by the excitation wave in the surface wave device back to the processing unit;

during the second phase, measuring the signal level of the response signal generated from the response wave, said measurement being performed in an evaluation circuit of the processing unit, and storing the signal level and the associated transmit frequency in a memory of the processing unit;

repeating the aforementioned method steps as one measurement for each of a plurality of different frequencies from the frequency band;

comparing at least the signal level from the current measurement to the signal level of the last measurement; and determining the current temperature of the surface wave device by selecting the transmit frequency having the highest signal level.

In addition to a less complex circuitry and reduced susceptibility to failure, a particular advantage that can be achieved with the present invention is the reduced manufacturing cost.

In an advantageous refinement of the teaching of the present invention, the current temperature is used to control the cooking process and/or displayed on a display device of the household appliance.

One advantageous refinement proposes that the transmit frequency be selected from the frequency band from about 433 MHz to about 434 MHz, and that the transmit frequencies immediately adjacent to each other in the frequency band differ from each other by about 5 kHz or less. This frequency band can be used without restrictions in various countries. Another advantageous frequency band would be from about 868 MHz to about 869 MHz, because, in this case, the antenna for transmitting the excitation wave and receiving the response wave can be smaller, and thus more space-efficient.

In another advantageous refinement, the high-frequency response signal is converted to a low-frequency response signal in the processing unit prior to processing in the evaluation circuit. This simplifies further processing and allows for simpler and, therefore, more cost-effective electrical circuits.

In a further refinement, the response signal is rectified in the processing unit prior to processing in the evaluation circuit. In this manner, further processing is simplified even more.

In an advantageous embodiment, the same transmit frequency is used several times immediately after each other, and an average signal level is calculated from the individual signal levels for a transmit frequency, said average signal level being stored and used for comparison. This improves the accuracy of the temperature measurement.

In an advantageous refinement, the signal levels generated by at least two surface wave devices in the same frequency band are evaluated in the evaluation circuit. This reduces the complexity of the circuitry when using at least two surface wave devices.

In another advantageous embodiment, only the highest signal level up to the current measurement and the associated transmit frequency are contained in the memory at any one time. This reduces memory requirements.

In an advantageous refinement of the teaching of the present invention, it is proposed that, in a first method step prior to the other method steps, the temperature-dependent resonant frequencies associated with the surface wave device or with the individual surface wave devices are recalibrated in the evaluation circuit with the aid of an additional temperature measuring probe which is in signal communication with the processing unit and contains a temperature sensor in which the correlation between the input and the output is substantially constant over its lifetime. In this manner, the accuracy of the temperature measurement is further improved.

In another advantageous refinement, at least two different frequency bands are used when the temperature measurement is performed using at least two surface wave devices, each of the at least two surface wave devices having one frequency band associated therewith. This allows a response signal to be uniquely associated with a surface wave device.

BRIEF DESCRIPTION OF THE DRAWINGS

An exemplary embodiment of the present invention is shown in the drawings in a purely schematic way and will be described in more detail below. In the drawings.

DETAILED DESCRIPTION

Figure 1:
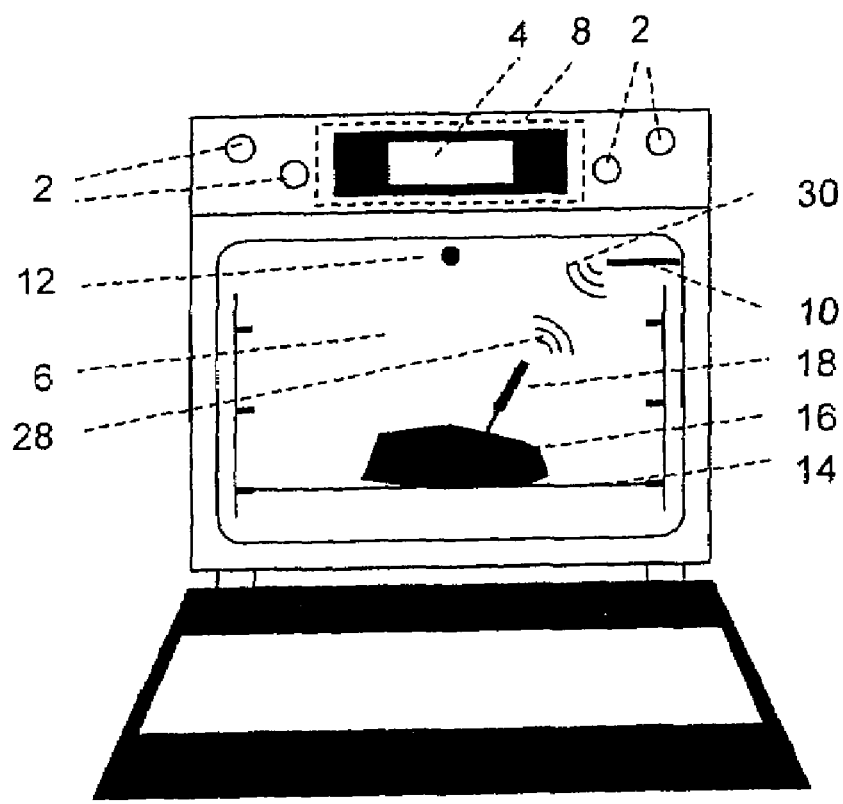
FIG. 1 is a front view of a household appliance in which a method according to the present invention is used.

FIG. 1 shows a household appliance in the form of a baking oven in which the method according to the present invention is used. The baking oven has control elements 2 and a display device 4, an oven chamber 6 and an electrical processing unit 8 symbolized by a dashed line. Control elements 2 and display device 4 are connected in signal communication to electrical processing unit 8 in a manner known to those skilled in the art. The same applies to a cooking chamber antenna 10 and an additional temperature measuring probe 12, which is also disposed in oven chamber 6. Here, the additional temperature measuring probe 12 includes a PT 1000 temperature sensor. However, it is, in principle, also possible to use other types of temperature sensors that have a constant correlation between the input and the output over their lifetimes. It is also possible to use a plurality of additional temperature measuring probes 12 instead of only one additional temperature measuring probe 12, which will be explained in more detail hereinafter.

The food to be cooked 16 is placed on a food-supporting member 14 and inserted in oven chamber 6, said food being in the form of a piece of meat and pierced with a temperature measuring probe 18 in the form of a cooking skewer. The design of temperature measuring probe 18 is explained in more detail with reference to FIG. 2. Temperature measuring probes 12 and 18 can, in principle, be selected within wide suitable limits in terms of type, material, size and arrangement.

Figure 2:
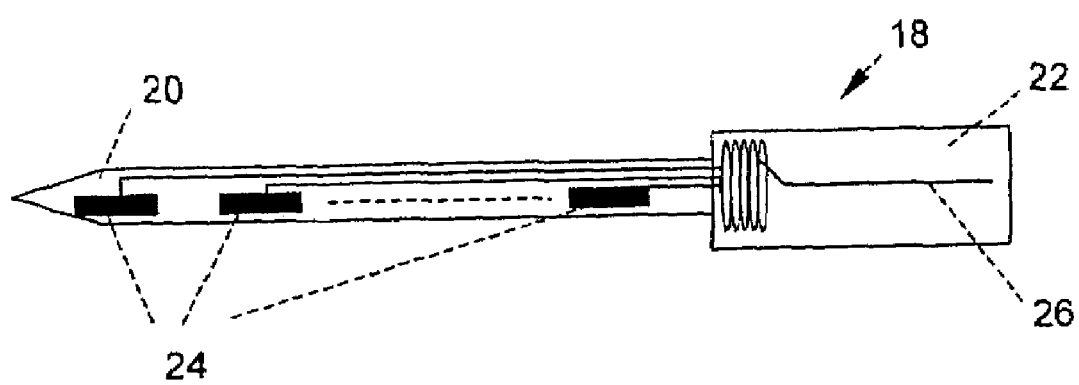
FIG. 2 is a cross-sectional side view of the temperature measuring probe of FIG. 1.

FIG. 2 shows temperature measuring probe 18 in detail. Temperature measuring probe 18 includes a skewer 20 and a handle 22; a plurality of temperature sensors in the form of surface wave devices 24 being disposed in skewer 20. Surface wave devices 24 are selected such that the temperature-dependent resonant frequencies corresponding to the temperatures expected at temperature measuring probe 18 during operation of the household appliance are contained in the frequency band from about 433 MHz to about 434 MHz, which is selected for the present exemplary embodiment. The individual surface wave devices 24 are electrically conductively connected, in a manner known to those skilled in the art, to an antenna 26 disposed in handle 22. In order to make antenna 26 as space-efficient as possible, part of it is in the form of a loading coil. However, antenna 26 does not necessarily have to be designed in this manner.

Figure 3:
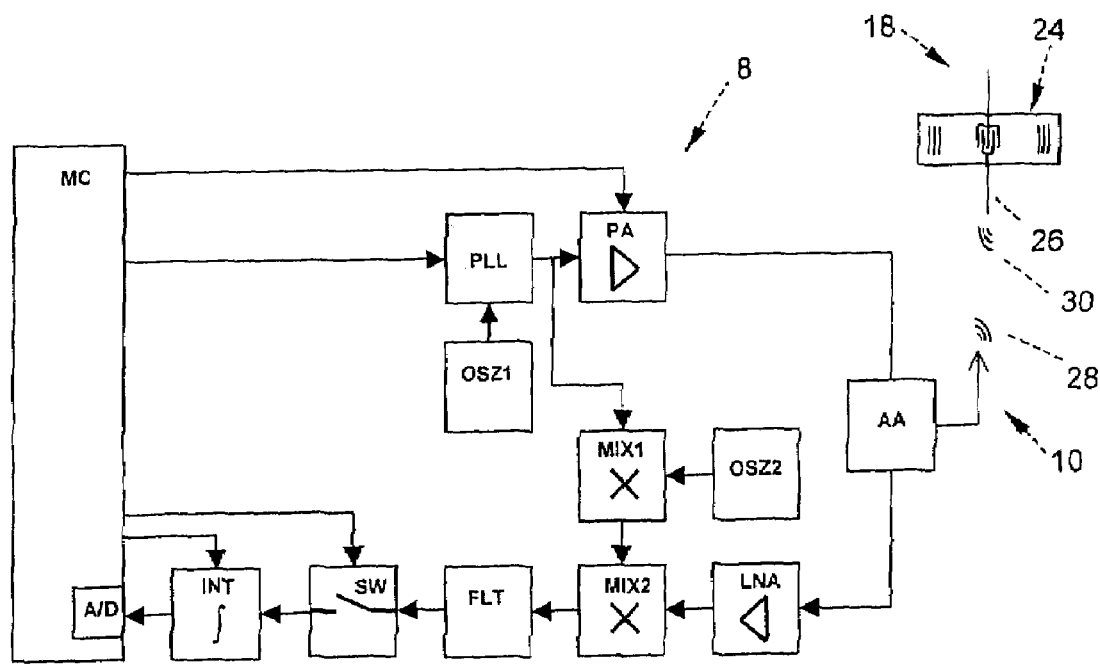
FIG. 3 is a block diagram of the processing unit and the temperature measuring probe.

The interaction of temperature measuring probe 18 and processing unit 8 is illustrated, by way of example, with reference to FIG. 3. For the sake of simplicity, the mode of operation is explained with reference to only one surface wave device 24.

FIG. 3 is a block diagram including processing unit 8 to the left of the image plane and temperature measuring probe 18 to the right of the image plane. Processing unit 8 includes an arithmetic unit MC which is connected to a phase-locked loop PLL, an oscillator OSZ 1 and a power amplifier PA in such a manner that a high-frequency excitation signal can be generated and that, during a first phase, said excitation signal can be radiated as a high-frequency excitation wave via an antenna-matching network AA and cooking chamber antenna 10 in the direction of temperature measuring probe 18 located in oven chamber 6. The transmit frequency of the excitation signal, and thus of the electromagnetic excitation wave, is selected here from the frequency band from about 433 MHz to about 434 MHz. At the beginning, the transmit frequency is 433 MHz in this case. The excitation wave is wirelessly transmitted to antenna 26, as symbolized in FIGS. 1 and 3 by curved lines 28. During the first phase, the evaluation circuit formed by a resettable integrator INT and an analog-to-digital converter A/D is inhibited by a switch SW, so that the electromagnetic waves received by cooking chamber antenna 10 during the first phase and the electrical signals generated therefrom are not evaluated (see FIG. 3). However, it is, in principle, also possible to use other suitable inhibiting methods known to those skilled in the art.

In the surface wave devices 24, which are electrically conductively connected to antenna 26 and of which only one is symbolically shown in FIG. 3, electromagnetic response waves are generated in a manner known to those skilled in the art. During a second phase immediately following the first phase, said electromagnetic response waves are wirelessly transmitted back to processing unit 8 via antenna 26 and cooking chamber antenna 10. During the second phase, no excitation signal is generated and, therefore, no excitation wave is radiated. This is symbolized in FIGS. 1 and 3 by curved lines 30. The electromagnetic response wave transmitted back generates a response signal in processing unit 8. Said response signal is then amplified, converted to a low-frequency signal, and filtered in a manner known to those skilled in the art, which is schematically shown in FIG. 3 by the symbols LNA for an input amplifier, MIX 1 and MIX 2 for mixers, OSZ 2 for an oscillator and FLT for a filter. During this second phase, switch SW is closed by arithmetic unit MC, so that the response signal can enter the evaluation unit. Integrator INT integrates the previously rectified response signal and determines the signal level of the response signal, that is, the absolute amplitude values of the response signal are summed up. Then, the signal level is digitized in analog-to-digital converter A/D of arithmetic unit MC and stored in a memory of arithmetic unit MC along with the associated transmit frequency.

The duration of the first phase must be such that in the resonant case, surface wave device 24 can be sufficiently excited, for example, 100 µs. Knowning from experience that the response wave, and thus the response signal, decays after a period of from 30 to 50 µs, it is sufficient for the second phase to be set to 50 µs. However, the first and second phases may also have durations different from those mentioned above.

The excitation signal and the response signal will be explained below with reference to FIGS. 4 and 5.

Figure 4:
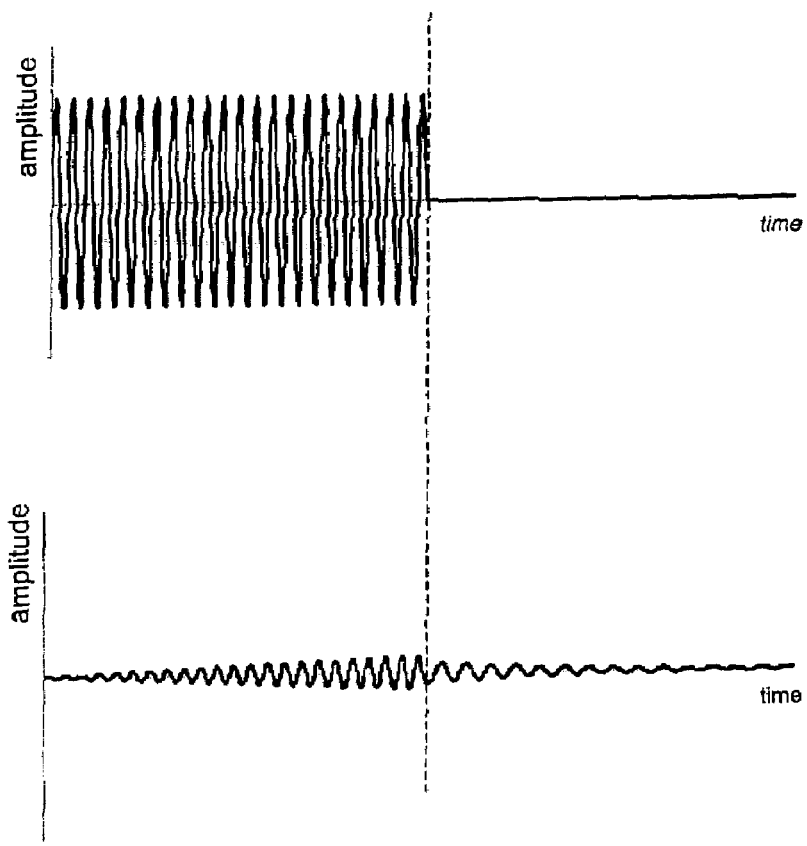
FIG. 4 is a graph showing the time histories of the amplitudes of the excitation and response signals at a transmit frequency far from the resonant frequency of the surface wave device.

In FIG. 4, the excitation signal and the response signals are shown for the case where the transmit frequency used for the current measurement is far from the resonant frequency. The upper part of FIG. 4 shows the variation with time of the excitation signal, while the variation with time of the response signal is depicted in the lower part. The change from the first phase shown to the left of the image plane to the second phase shown to the right of the image plane is visualized by a dashed line. As can be clearly seen in FIG. 4 from the increase in amplitude of the response signal, surface wave device 24 is excited to oscillate during the first phase. However, since the transmit frequency is far from the resonant frequency, the amplitudes of the response signal are small. After the end of the first phase, and thus of the excitation of surface wave device 24, the amplitude of the response signal decreases to zero.

Figure 5:
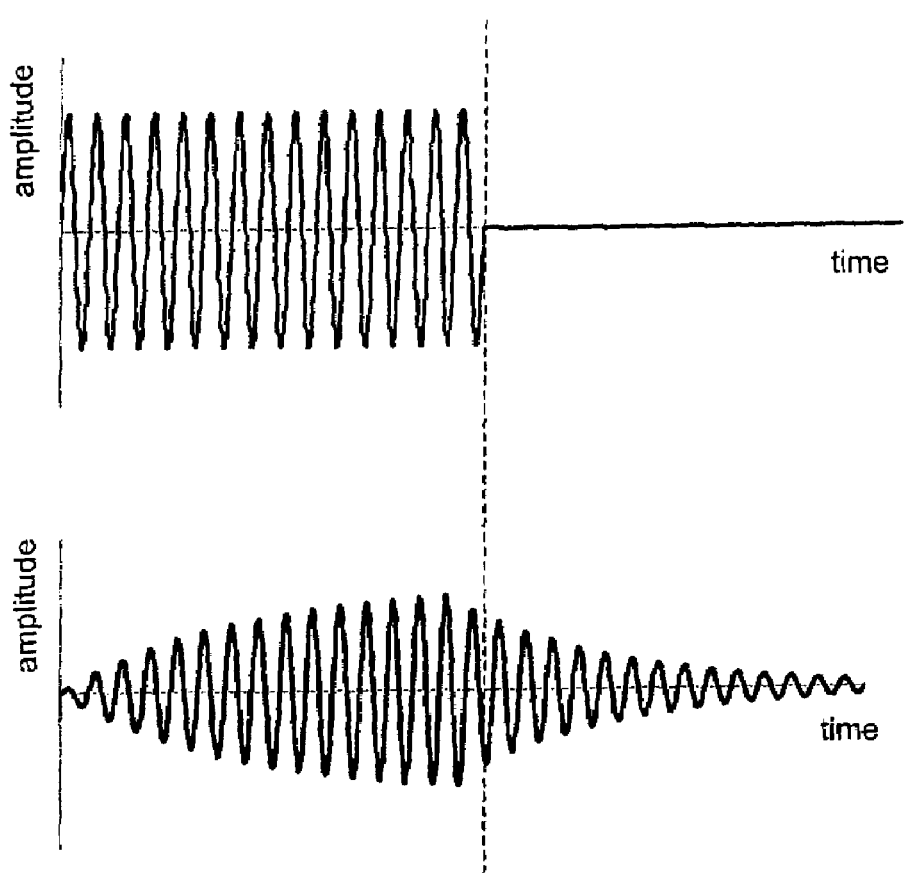
FIG. 5 is a graph showing the time histories of the amplitudes of the excitation and response signals at a transmit frequency close to the resonant frequency of the surface wave device.

FIG. 5 also shows the variation with time of the excitation signal and the response signal, but for a transmit frequency close to the resonant frequency. Unlike the time history of FIG. 4, the amplitudes of the response signal are significantly larger here.

The above sequence is repeated for a plurality of different transmit frequencies, it being required for integrator INT to be reset each time before the next measurement is made. In the present exemplary embodiment, the transmit frequency is increased by 5 kHz for each additional measurement; i.e., for example, from a first transmit frequency of 433 MHz to a second transmit frequency of 433.005 MHz. In order to keep memory requirements as low as possible, only the highest signal level up to the current measurement and the associated transmit frequency are stored. The stored signal level is compared in arithmetic unit MC to the current signal level. If, for example, the signal level in the second measurement is higher than in the first measurement, then the signal level of the first measurement and the associated transmit frequency, namely 433 MHz, are deleted from the memory. The memory is then overwritten with the signal level of the second measurement and the associated signal frequency, namely 433.005 MHz; the signal level of the second measurement, in turn, being compared to the signal level of the third measurement, and so on. Once the whole frequency band been has been covered in this manner, the highest signal level and the associated transmit frequency are determined. Using a table or function stored in arithmetic unit MC, the current temperature at surface wave device 24 can be determined based on the transmit frequency in a manner known to those skilled in the art.

Figure 6:
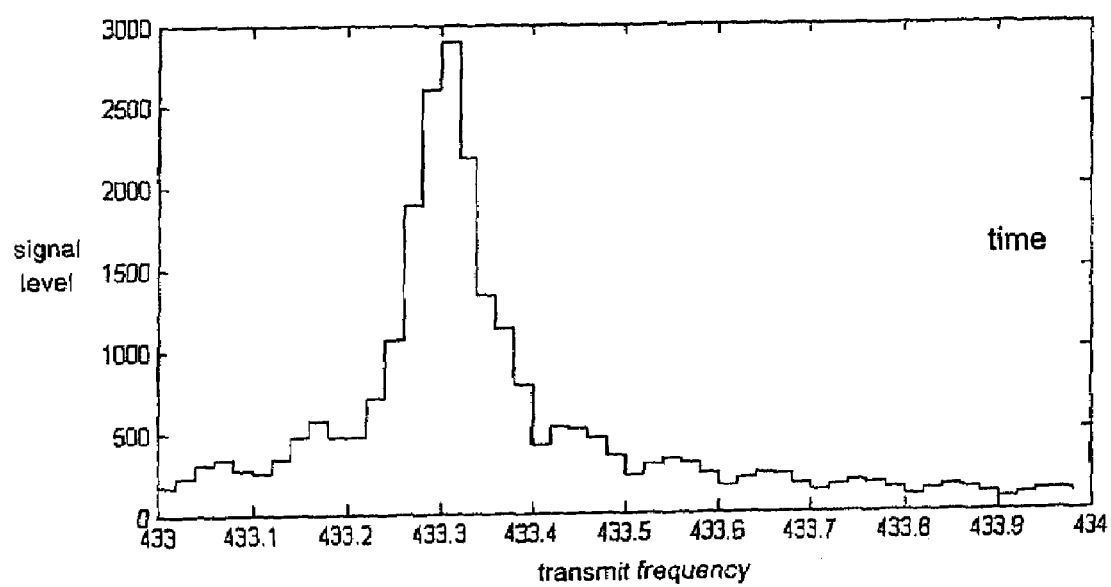
FIG. 6 is a graph showing the signal level as a function of the transmit frequency.

FIG. 6 shows the signal level as a function of the transmit frequency. The signal level at the resonant frequency stands out clearly from the other signal levels, so that an evaluation, and thus the determination of the current temperature at surface wave device 24, can be easily performed.

In the present exemplary embodiment, surface wave device 24 is automatically recalibrated at regular and predefined intervals, for example, to reduce or prevent the negative effects that a drift over the lifetime of surface wave devices 24 would have on the accuracy of the temperature measurement. For example, said recalibration may take place in each case before oven chamber 6 is heated up from ambient temperature. To do this, additional temperature measuring probe 12 is used. If the temperatures determined by temperature measuring probes 18 and 12 differ from each other, all of the associations of temperatures and resonant frequencies stored for surface wave device 24 are corrected by this difference. To improve the accuracy of the recalibration, it would also be conceivable for the recalibration to be performed based on a plurality of temperature measurements, especially at different temperatures.

The above explanations regarding a single surface wave device 24 apply analogously to the other surface wave devices 24 of temperature measuring probe 18. In order to allow the response signals to be uniquely associated with the respective surface wave devices 24, the frequency band is further divided into narrower frequency bands according to the number of surface wave devices 24. Alternatively, it would also be possible for all surface wave devices 24 to have one common frequency band associated therewith. In this case, however, more memory is required because several signal levels have to be processed simultaneously. In the present case of a temperature measuring probe 18 in the form of a cooking skewer, an average food temperature could be determined from the signal levels. It would also be conceivable to determine the lowest and highest temperatures that are simultaneously present in the food to be cooked 16.

In the present exemplary embodiment, the temperatures so determined are used to control the cooking process. The heating mode and intensity as well as the circulation of fresh air through oven chamber 6 are controlled according to the temperature distribution in the food to be cooked 16. Moreover, the current temperatures are displayed on display device 4. However, other ways of controlling the cooking process are also made possible by this method.

In a departure from the exemplary embodiment, it is also conceivable for temperature measuring probe 18 to be arranged and designed differently. Temperature measuring probe 18 could be mounted in a fixed position on or in oven chamber 6, for example, on the receiving members for food-supporting member 14. Further, instead of a cooking skewer, temperature measuring probe 18 may be designed and arranged in other suitable ways known to those skilled in the art. In order to increase the accuracy of the temperature measurement, the spacing between the individual transmit frequencies could be selected to be less than 5 kHz.

The above-mentioned conditioning of the response signal prior to its transmission to the evaluation circuit is not mandatory, but it makes evaluation easier and reduces the complexity of the circuitry. In principle, however, it is also conceivable to evaluate the high-frequency, non-rectified response signal. Furthermore, the teaching of the present invention is not limited to the use of an integrator INT for evaluating the response signal. It is also conceivable to use other suitable circuits and methods for generating a signal level which are known to those skilled in the art.

What is claimed is:

1. A method for temperature measurement in a household appliance, comprising the steps:

a) generating, using an electrical processing unit of the household appliance, a high-frequency electromagnetic excitation wave of a predefined transmit frequency, the transmit frequency being in a frequency band including temperature-dependent resonant frequencies that occur in a surface wave device incorporated in a temperature measuring probe and which frequencies respectively correspond to temperatures expected at the temperature measuring probe during operation of the household appliance;

b) during a first phase, wirelessly transmitting the excitation wave to the surface wave device;

c) during a second phase following the first phase, wirelessly transmitting to the processing unit an electromagnetic response wave generated by the excitation wave in the surface wave device;

d) during the second phase, measuring, in an evaluation circuit of the processing unit, a signal level of a response signal generated from the response wave, and storing the signal level and the associated transmit frequency in a memory of the processing unit;

e) repeating steps a)-d) for at least one additional different transmit frequency selected from the frequency band;

f) comparing at least the signal level of a current measurement to the signal level of a previous measurement so as to determine the higher signal level; and g) determining a current temperature of the surface wave device by selecting the transmit frequency associated with the higher signal level.

2. The method as recited in claim 1 wherein the second phase immediately follows the first phase.

3. The method as recited in claim 1 further comprising using the determined current temperature to control a cooking process.

4. The method as recited in claim 1 further comprising displaying the determined current temperature on a display device of the household appliance.

5. The method as recited in claim 1 wherein the frequency band ranges from about 433 MHz to about 434 MHz, and immediately adjacent transmit frequencies of the transmit frequencies in the frequency band differ from each other by about 5 kHz or less.

6. The method as recited in claim 1 further comprising converting, in the processing unit prior to the measuring in the evaluation circuit, the response signal from a high-frequency into a low-frequency.

7. The method as recited in claim 1 further comprising rectifying, in the processing unit, the response signal prior to the measuring in the evaluation circuit.

8. The method as recited in claim 1 further comprising:
repeating steps a)-d) a plurality of times immediately after each other for a same transmit frequency;
calculating an average signal level from the respective measured signal levels for the same transmit frequency;
storing the calculated average signal level; and
using, for the comparing, the calculated average signal level as the signal level of the current measurement or the signal level of the previous measurement.

9. The method as recited in claim 1 further comprising the steps:
h) generating, using the processing unit of the household appliance, a second high-frequency electromagnetic excitation wave of a second predefined transmit frequency, the second transmit frequency being selected from the frequency band, the frequency band including second temperature-dependent resonant frequencies that occur in a second surface wave device incorporated in the temperature measuring probe and which respectively correspond to second temperatures expected at the temperature measuring probe during operation of the household appliance;
i) during a third phase, wirelessly transmitting the second excitation wave to the surface wave device;
j) during a fourth phase following the second phase, wirelessly transmitting to the processing unit a second electromagnetic response wave generated by the second excitation wave in the second surface wave device; and
k) during the fourth phase, measuring, in the evaluation circuit of the processing unit, a second signal level of a second response signal generated from the second response wave, and storing the second signal level and the associated second transmit frequency in a memory of the processing unit.

10. The method as recited in claim 9 further comprising, prior to step a), calibrating, by the evaluation circuit, using an additional temperature measuring probe, the respective temperature-dependent resonant frequencies of the surface wave device and the second surface wave device, the additional temperature measuring probe being in signal communication with the processing unit and including a temperature sensor having a correlation between an input and an output that is substantially constant over a lifetime of the temperature sensor.

11. The method as recited in claim 1 further comprising the steps:
h) generating, using the processing unit of the household appliance, a second high-frequency electromagnetic excitation wave of a second predefined transmit frequency, the second transmit frequency being selected from the frequency band, the frequency band including second temperature-dependent resonant frequencies that occur in a second surface wave device incorporated in the temperature measuring probe and which respectively correspond to second temperatures expected at the temperature measuring probe during operation of the household appliance;
i) during a third phase, wirelessly transmitting the second excitation wave to the surface wave device;
j) during a fourth phase following the second phase, wirelessly transmitting to the processing unit a second electromagnetic response wave generated by the second excitation wave in the second surface wave device;
k) during the fourth phase, measuring, in the evaluation circuit of the processing unit, a second signal level of a second response signal generated from the second response wave, and storing the second signal level and the associated second transmit frequency in a memory of the processing unit;
l) repeating steps h)-k) for at least one additional different transmit frequency selected from the second frequency band;
m) comparing at least the second signal level of a current measurement to the second signal level of a previous measurement so as to determine the higher second signal level; and
n) determining a second current temperature of the second surface wave device by selecting the second transmit frequency associated with the higher second signal level.

12. The method as recited in claim 1 further comprising, prior to step a), calibrating, by the evaluation circuit, using an additional temperature measuring probe, the temperature-dependent resonant frequencies of the surface wave device, the additional temperature measuring probe being in signal communication with the processing unit and including a temperature sensor having a correlation between an input and an output that is substantially constant over a lifetime of the temperature sensor.

13. The method as recited in claim 1 further comprising the steps:
   h) generating, using the processing unit of the household appliance, a second high-frequency electromagnetic excitation wave of a second predefined transmit frequency, the second transmit frequency being in a second frequency band including second temperature-dependent resonant frequencies that occur in a second surface wave device incorporated in the temperature measuring probe and which second frequencies respectively correspond to second temperatures expected at the temperature measuring probe during operation of the household appliance;
   i) during a third phase, wirelessly transmitting the second excitation wave to the surface wave device;
   j) during a fourth phase following the second phase, wirelessly transmitting to the processing unit a second electromagnetic response wave generated by the second excitation wave in the second surface wave device;
   k) during the fourth phase, measuring, in the evaluation circuit of the processing unit, a second signal level of a second response signal generated from the second response wave, and storing the second signal level and the associated second transmit frequency in a memory of the processing unit;
   l) repeating steps h)-k) for at least one additional different transmit frequency selected from the second frequency band;
   m) comparing at least the second signal level of a current measurement to the second signal level of a previous measurement so as to determine the higher second signal level; and
   n) determining a second current temperature of the second surface wave device by selecting the second transmit frequency associated with the higher second signal level.

14. A method for temperature measurement in a household appliance, comprising the steps:
   a) generating, using an electrical processing unit of the household appliance, a high-frequency electromagnetic excitation wave of a predefined transmit frequency, the transmit frequency being in a frequency band including temperature-dependent resonant frequencies that occur in a surface wave device incorporated in a temperature measuring probe and which frequencies respectively correspond to temperatures expected at the temperature measuring probe during operation of the household appliance;
   b) during a first phase, wirelessly transmitting the excitation wave to the surface wave device;
   c) during a second phase following the first phase, wirelessly transmitting to the processing unit an electromagnetic response wave generated by the excitation wave in the surface wave device;
   d) during the second phase, measuring, in an evaluation circuit of the processing unit, a signal level of a response signal generated from the response wave;
   e) repeating steps a)-d) for at least one additional different transmit frequency selected from the frequency band;
   f) comparing at least the signal level of a current measurement to the signal level of a previous measurement so as to determine the higher signal level;
   g) determining a current temperature of the surface wave device by selecting the transmit frequency associated with the higher signal level; and
   h) storing the higher signal level and the associated transmit frequency in a memory of the processing unit.

15. A method for temperature measurement as recited in claim 1 further comprising the steps:
   h) generating, using the electrical processing unit of the household appliance, a second high-frequency electromagnetic excitation wave of a second predefined transmit frequency, the second transmit frequency being in a second frequency band including second temperature-dependent resonant frequencies that occur in a second surface wave device incorporated in a second temperature measuring probe and which second frequencies respectively correspond to temperatures expected at the second temperature measuring probe during operation of the household appliance;
   i) during a third phase, wirelessly transmitting the second excitation wave to the surface wave device;
   j) during a fourth phase following the second phase, wirelessly transmitting to the processing unit a second electromagnetic response wave generated by the second excitation wave in the second surface wave device;
   k) during the fourth phase, measuring, in the evaluation circuit of the processing unit, a second signal level of a second response signal generated from the second response wave, and storing the second signal level and the associated second transmit frequency in a memory of the processing unit;
   l) repeating steps h)-k) for at least one additional different transmit frequency selected from the second frequency band;
   m) comparing at least the second signal level of a current measurement to the second signal level of a previous measurement so as to determine the higher second signal level; and
   n) determining a second current temperature of the second surface wave device by selecting the second transmit frequency associated with the higher second signal level.

* * * * *